United States Patent

Schumann et al.

(10) Patent No.: US 12,327,491 B2
(45) Date of Patent: Jun. 10, 2025

(54) INFORMATION PROCESSING DEVICE AND INFORMATION PROCESSING METHOD

(71) Applicant: Moon Creative Lab Inc., Palo Alto, CA (US)

(72) Inventors: Nic Schumann, Palo Alto, CA (US); Daniel Brenners, Palo Alto, CA (US); Bryan Ma, Tokyo (JP); Mateus Rezende, Tokyo (JP); Justin Chen, Palo Alto, CA (US)

(73) Assignee: Moon Creative Lab Inc.

( * ) Notice: Subject to any disclaimer, the term of this patent is extended or adjusted under 35 U.S.C. 154(b) by 80 days.

(21) Appl. No.: 18/144,623

(22) Filed: May 8, 2023

(65) Prior Publication Data

US 2024/0379016 A1 Nov. 14, 2024

(51) Int. Cl.
*G09B 5/02* (2006.01)
*G09B 19/06* (2006.01)
*G10L 21/12* (2013.01)

(52) U.S. Cl.
CPC ............... *G09B 5/02* (2013.01); *G09B 19/06* (2013.01); *G10L 21/12* (2013.01)

(58) Field of Classification Search
CPC ................................. G09B 19/04; G09B 19/06
See application file for complete search history.

(56) References Cited

U.S. PATENT DOCUMENTS

| | | | | |
|---|---|---|---|---|
| 2003/0028378 A1* | 2/2003 | August | .................... | G10L 13/00 704/260 |
| 2005/0255431 A1* | 11/2005 | Baker | .................... | G09B 19/06 434/169 |
| 2014/0342324 A1* | 11/2014 | Ghovanloo | .............. | G09B 5/06 434/185 |
| 2015/0056580 A1* | 2/2015 | Kang | .................... | G09B 19/04 434/157 |
| 2018/0277017 A1* | 9/2018 | Cheung | .................... | G09B 5/06 |

FOREIGN PATENT DOCUMENTS

JP  WO2013031677 A1  3/2015

* cited by examiner

*Primary Examiner* — Kang Hu
*Assistant Examiner* — Correll T French
(74) *Attorney, Agent, or Firm* — Osha Bergman Watanabe & Burton LLP

(57) ABSTRACT

An information processing apparatus includes an audio information obtaining unit obtaining audio information on a user learning a first language, an analysis processing unit estimating a voice production condition of the user in accordance with analyzing the audio information, and a display processing unit displaying voice production condition images in animated display in accordance with a time-series change of the voice production condition. The display processing unit executes processing to superimpose to display a first feature point and a second feature point on the voice production condition images. The first feature point is identified in accordance with the voice production condition observed when a first sound in the first language is pronounced. The second feature point is identified in accordance with the voice production condition observed when a second sound similar to the first sound is pronounced in a second language different from the first language.

10 Claims, 13 Drawing Sheets

INFORMATION PROCESSING DEVICE AND INFORMATION PROCESSING METHOD

BACKGROUND OF THE INVENTION

1. Field of the Invention

The present invention relates to, for example, an information processing apparatus and an information processing method.

2. Description of the Related Art

There is a conventionally known technique to visualize a voice production condition of a user in accordance with audio information.

For example, Japanese Patent Application No. 2013-531279 discloses a sound generation visualization apparatus that converts audio data into a vocal tract parameter, generates a coordinate vector sequence in accordance with the vocal tract parameter and a discriminator, and displays an image based on the coordinate vector sequence.

The technique of Patent Document 1 involves displaying an image of, for example, tongue movement associated with voice production. However, the technique fails to reflect a relationship between the sound of a learning-target language (e.g., English) and the sound of another language (e.g., the native language of a learner).

SUMMARY OF THE INVENTION

One or more aspects of the present disclosure can provide, for example, an information processing apparatus and an information processing method that appropriately support a user who learns language.

An aspect of the present disclosure relates to an information processing apparatus including: an audio information obtaining unit that obtains audio information on a user learning a first language; an analysis processing unit that estimates a voice production condition representing conditions of a jaw and a tongue of the user, in accordance with processing of analyzing the audio information; and a display processing unit that executes processing to present a plurality of voice production condition images in animated display, in accordance with a time-series change of the estimated voice production condition, wherein the display processing unit executes processing to superimpose to display a first feature point and a second feature point on the plurality of voice production condition images in the animated display, the first feature point being identified in accordance with the voice production condition observed when a first sound in the first language is pronounced, and the second feature point being identified in accordance with the voice production condition observed when a second sound similar to the first sound is pronounced in a second language different from the first language.

Another aspect of the present disclosure relates to an information processing method including: obtaining audio information on a user learning a first language; estimating a voice production condition representing conditions of a jaw and a tongue of the user, in accordance with processing of analyzing the audio information; and executing display processing to present a plurality of voice production condition images in animated display, in accordance with a time-series change of the estimated voice production condition, wherein the display processing involves executing processing to superimpose to display a first feature point and a second feature point on the plurality of voice production condition images in the animated display, the first feature point being identified in accordance with the voice production condition observed when a first sound in the first language is pronounced, and the second feature point being identified in accordance with the voice production condition observed when a second sound similar to the first sound is pronounced in a second language different from the first language.

DETAILED DESCRIPTION OF THE INVENTION

Figure 1:
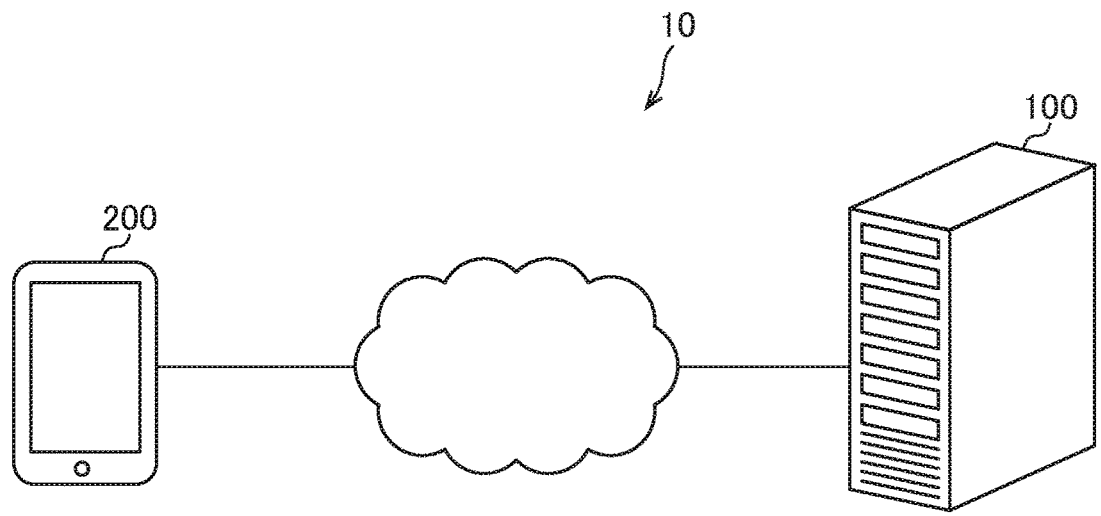
FIG. 1 is an exemplary configuration of an information processing system including an information processing apparatus.

Described below is an embodiment, with reference to the drawings. Throughout the drawings, like reference numerals designate identical or corresponding components. Such components will not be elaborated upon repeatedly. Note that this embodiment described below will not be intended to unduly limit the features of the claims. Furthermore, not all of the features described in this embodiment are essential constituent features of the present disclosure.

1. Exemplary Configuration of System

FIG. 1 is an exemplary configuration of an information processing system 10 including an information processing apparatus of this embodiment. The information processing system 10 of this embodiment includes: a server system 100; and a terminal apparatus 200. Note that, a configuration of the information processing system 10 is not necessarily limited to the configuration illustrated in FIG. 1. The configuration can be modified in various manners such as, for example, omitting a part of the configuration and adding another configuration. The same applies to FIGS. 2 and 3, which will be shown later, in that modifications such as omission and addition of a configuration can be made.

The information processing apparatus of this embodiment corresponds to, for example, the server system 100. Note that a technique of this embodiment shall not be limited to the server system 100. The processing on the information processing apparatus described in this specification may be executed by distributed processing using the server system 100 and another apparatus. For example, the information processing apparatus of this embodiment may include both of the server system 100 and the terminal apparatus 200. Furthermore, the information processing apparatus of this embodiment may be the terminal apparatus 200. This specification below describes an exemplary case where, mainly, the information processing apparatus is the server system 100.

The server system 100 may be a single server or may include a plurality of servers. For example, the server system 100 may include a database server and an application server. The database server stores various kinds of data such as information on vowels and consonants of a first language (a learning-target language, for example, English) and information on vowels and consonants of a second language (a language other than the first language, for example, Japanese). The application server executes processing to be described later as seen in, for example, FIG. 4. Note that, here, the plurality of servers may be either physical servers or virtual servers. Furthermore, if the virtual servers are used, the virtual servers may be either provided to one physical server, or distributed among a plurality of physical servers. As described above, the specific configuration of the server system 100 in this embodiment can be modified in various manners.

The terminal apparatus 200 is used by a user who uses a service (for example, a language learning service) implemented on the information processing system 10. The terminal apparatus 200 may be a personal computer (PC), a mobile terminal apparatus such as a smartphone, or another apparatus having a function described in this specification.

The server system 100 is communicably connected to the terminal apparatus 200 through, for example, a network. The network here is, for example, a public communications network such as the Internet. Alternatively, the network may be, for example, a local area network (LAN).

The information processing system 10 of this embodiment may be a system to provide learning support to a user who learns, for example, the first language. The user here may be a native speaker of the second language different from the first language. Described below is a case where the first language is English and the second language is Japanese. Note that the first language and the second language may be different languages, and the language pair shall not be limited to that of these languages. For example, if the first language is English, the second language may be Thai, Indonesian, or any other language. Furthermore, the first language may be a language other than English.

Figure 2:
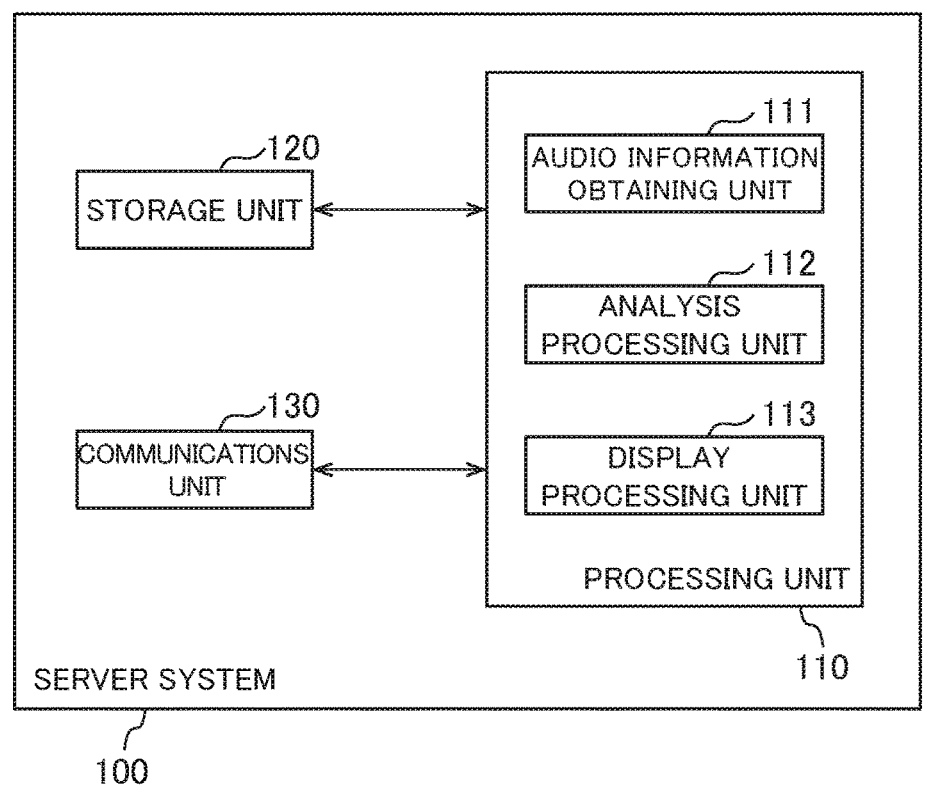
FIG. 2 is an exemplary configuration of a server system.

FIG. 2 is a functional block diagram illustrating a detailed exemplary configuration of the server system 100. The server system 100 includes, as illustrated in FIG. 2, for example, a processing unit 110, a storage unit 120, and a communications unit 130.

The processing unit 110 of this embodiment includes hardware to be described below. The hardware can include at least one of a digital-signal processing circuit or an analog-signal processing circuit. For example, the hardware can include one or more circuit apparatuses and one or more circuit elements mounted on a circuit board. The one or more circuit apparatuses may be, for example, integrated circuits (ICs) and field-programmable gate arrays (FPGAs). The one or more circuit elements may be, for example, resistors and capacitors.

Furthermore, the processing unit 110 may be implemented in the form of a processor below. The server system 100 of this embodiment includes a memory for storing information, and a processor operating on the information stored in the memory. The information includes, for example, a program and various kinds of data. The program may include one that causes the server system 100 to execute processing to be described in this specification. The processor includes hardware. The processor can include various kinds of processors such as a central processing unit (CPU), a graphics processing unit (GPU), and a digital signal processor (DSP). The memory may include: a semiconductor memory such as a static random access memory (SRAM), a dynamic random access memory (DRAM), or a flash memory; a register; a magnetic storage device such as a hard disk drive (HDD); and an optical storage device such as an optical disc device. For example, the memory stores computer-readable instructions. When the processor executes the instructions, the functions of the processing unit 110 are implemented as the processing. The instructions here may be either an instruction set including a program or instructions given to a hardware circuit of the processor to execute an operation.

The processing unit 110 includes, for example, an audio information obtaining unit 111, an analysis processing unit 112, and a display processing unit 113. Note that, as described above, the information processing apparatus of this embodiment may be implemented in the form of distributed processing executed between the server system 100 and the terminal apparatus 200. Alternatively, the information processing apparatus may be the terminal apparatus 200. Hence, at least one or more of the audio information obtaining unit 111, the analysis processing unit 112, and the display processing unit 113 may be provided to the terminal apparatus 200.

The audio information obtaining unit 111 obtains audio information on the user learning the first language. The audio information here is, specifically, data as to audio in which the user say a word or a sentence in the first language. For example, the terminal apparatus 200 includes, for example, a microphone for recording audio of the user, and the audio information obtaining unit 111 obtains audio information from the terminal apparatus 200. However, in order to obtain the audio information, another apparatus may be provided separately from the terminal apparatus 200.

The analysis processing unit 112 executes processing to analyze the audio information to estimate a voice production condition representing conditions of the jaw and the tongue of the user. For example, this embodiment may involve machine learning of audio information for learning, in accordance with training data acting as correct answer data and provided with a voice production condition corresponding to the audio information. The analysis processing unit 112 obtains a learned model representing a result of the machine learning and inputs into the learned model audio information to be analyzed, in order to execute analysis processing.

The display processing unit 113 executes processing to present a plurality of voice production condition images in animated display, in accordance with a time-series change of the estimated voice production condition. The voice production condition images are images that can change positions of, for example, the tongue and the jaw. The voice production condition images show a profile of a person on a screen to be described later with reference to, for example, FIGS. 6 to 7. That is, the display processing unit 113 may execute processing to display a screen to be described later with reference to, for example, FIGS. 6 to 7. For example, the display processing unit 113 generates the plurality of voice production condition images in accordance with a time-series change of the voice production condition, and sequentially displays (in animated display) the plurality of voice production condition images on the display unit 240 of the terminal apparatus 200. Note that the display processing unit 113 does not have to generate the voice production condition images themselves. The display processing unit 113 may obtain information for generating (identifying) the voice production condition images. For example, the terminal apparatus 200 may store a plurality of candidates for the voice production condition images to be displayed in animated display, and the display processing unit 113 may transmit to the terminal apparatus 200 information identifying, from among the plurality of candidates, a voice production condition image to be displayed. Also in this case, the display processing 113 executes processing to present the plurality of voice production condition images in animated display.

The storage unit 120 is a working area of the processing unit 110, and stores various kinds of information. The storage unit 120 can be implemented in the form of various memories. The memories may include: a semiconductor memory such as an SRAM, a DRAM, a ROM, or a flash memory; a register; a magnetic storage device such as a hard disk device; and an optical storage device such as an optical disc device.

The storage unit 120 stores a learned model to be used for, for example, processing on the analysis processing unit 112. Furthermore, the storage unit 120 may store information (described later with reference to FIG. 5) in which a sound in the first language is associated with a position in a coordinate space (e.g., a two-dimensional coordinate plane). In addition, the storage unit 120 can store various kinds of information related to the processing in this embodiment.

The communications unit 130 is an interface to carry out communications through a network, and includes, for example, an antenna, a radio frequency (RF) circuit, and a baseband circuit. The communications unit 130 may operate under the control of the processing unit 110, or may include a communications control processor different from the processing unit 110. The communications unit 130 is an interface to carry out communications in accordance with, for example, the Transmission Control Protocol/Internet Protocol (TCP/IP). Note that a specific communications technique can be modified in various manners.

Figure 3:
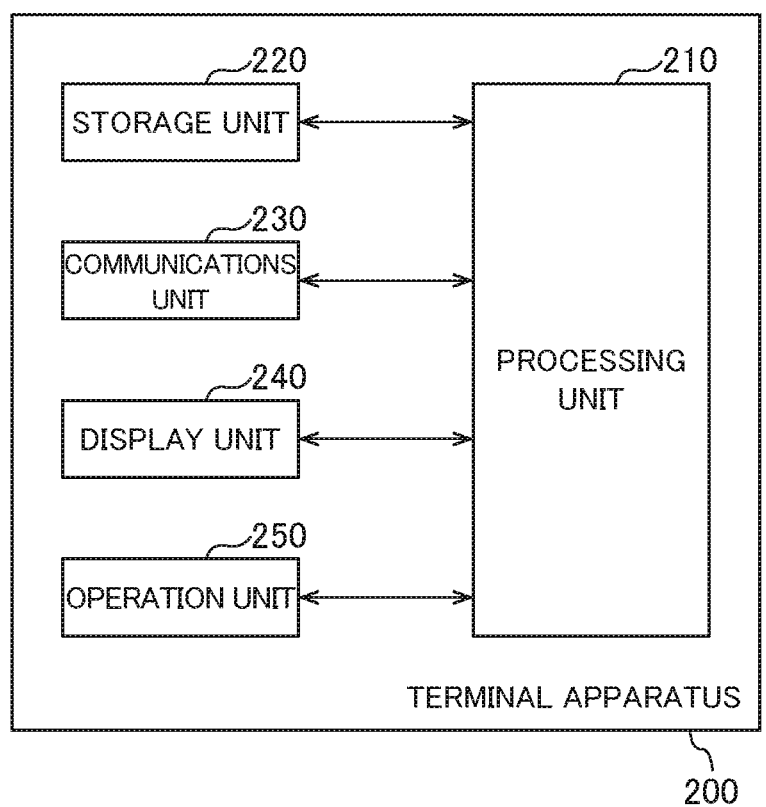
FIG. 3 is an exemplary configuration of a terminal apparatus.

FIG. 3 is a block diagram showing in detail an exemplary configuration of the terminal apparatus 200. The terminal apparatus 200 includes: a processing unit 210; a storage unit 220; a communications unit 230; a display unit 240; and an operation unit 250.

The processing unit 210 is hardware including at least one of a digital-signal processing circuit or an analog-signal processing circuit. Furthermore, the processing unit 210 may be implemented in the form of a processor. The processor can include various kinds of processors such as a CPU, a GPU, and a DSP. When the processor executes instructions stored in the memory of the terminal apparatus 200, a function of the processing unit 210 is implemented as processing.

The storage unit 220 is a working area of the processing unit 210, and implemented in the forms of various kinds of memories such as a SRAM, a DRAM, and a ROM.

The communications unit 230 is an interface to carry out communications through a network, and includes, for example, an antenna, an RF circuit, and a baseband circuit. The communications unit 230 communicates with the server system 100 through, for example, a network.

The display unit 240 is an interface to display various kinds of information. The display unit 240 may be a liquid crystal display, an organic EL display, or any other display. The display unit 240 displays various kinds of screens described later with reference to FIGS. 6 to 8B, 10A to 11B, and FIG. 13.

The operation unit 250 is an interface to receive an operation input by the user. The operation unit 250 may be, for example, a button provided to the terminal apparatus 200. Furthermore, the display unit 240 and the operation unit 250 may be combined into a touch panel.

The information processing apparatus of this embodiment includes a display processing unit (e.g., the display processing unit 113 of the server system 100) that executes processing to superimpose to display a first feature point and a second feature point on a plurality of voice production condition images in animated display. The first feature point is identified in accordance with a voice production condition observed when a first sound in the first language is produced. The second feature point is identified in accordance with a voice production condition observed when a second sound similar to the first sound is pronounced in the second language different from the first language. For example, when English words "hat", "hut", and "hot" are pronounced, the words contain respective vowels "ae", "α", and "Λ". Note that, here, ae, α, and Λ are characters substituted for phonetic symbols for convenience sake of notation, and are replaced with phonetic symbols in accordance with Table 1 below. Furthermore, the characters ae, α, and Λ are replaced elsewhere with the respective phonetic symbols in accordance with Table 1. Such a case is equally seen in other parts of this embodiment. For example, English corresponds to the first language, and at least one of ae, α or Λ corresponds to the first sound. Although these vowels should be clearly distinguished in English, Japanese users recognize them as pronunciations close to a Japanese character "ア". For example, Japanese corresponds to the second language, and the Japanese character "ア" corresponds to the second sound. When there are sounds that are easily misunderstood or confused by a speaker of the second language, the technique of this embodiment can arrange these sounds in different positions on animated display. As a result, the technique can clearly present to the user differences between "ae" and "ア", "α" and "ア", and "Λ" and "ア", and appropriately support the user learning the first language. A specific technique will be described later with reference to, for example, FIG. 6.

TABLE 1

| Substituing Character | Phonetic Symbol |
|---|---|
| ae | æ |
| α | α |
| Λ | Λ |

Furthermore, some or all of the processing executed on the information processing apparatus (the information processing system 10) of this embodiment may be implemented by a program. The processing executed on the information processing apparatus may be processing executed on the processing unit 110 of the server system 100, or processing executed on the processing unit 210 of the terminal apparatus 200, or both.

The program of this embodiment can be stored in a computer-readable non-transitory information storage medium. The information storage medium can be implemented in the form of, for example, an optical disc, a memory card, an HIDD, or a semiconductor memory. The semiconductor memory is, for example, a ROM. The processing unit 110 performs various kinds of processing in this embodiment, in accordance with a program stored in the information storage medium. That is, the information storage medium stores a program for causing a computer to function as, for example, the processing unit 110. The computer is an apparatus including: an input apparatus; a processing unit; a storage unit; and an output unit. Specifically, the program of this embodiment causes the computer to execute each of the steps to be described later with reference to, for example, FIG. 4.

Furthermore, a technique of this embodiment can be applied to an information processing method including the steps below. The information processing method includes steps of: obtaining audio information on a user learning the first language; estimating a voice production condition representing conditions of the jaw and the tongue of the user, in accordance with processing of analyzing the audio information; and executing display processing to present a plurality of voice production condition images in animated display, in accordance with a time-series change of the estimated voice production condition. Then, at the step of performing the display processing, the information processing method involves processing to superimpose to display a first feature point and a second feature point on the plurality of voice production condition images in the animated display. The first feature point is identified in accordance with a voice production condition observed when a first sound in the first language is pronounced. The second feature point is identified in accordance with a voice production condition observed when a second sound similar to the first sound is pronounced in the second language different from the first language.

2. Processing Details

Described below in detail is the processing of this embodiment.

2.1 Basic Sequence of Pronunciation Practice

Figure 4:
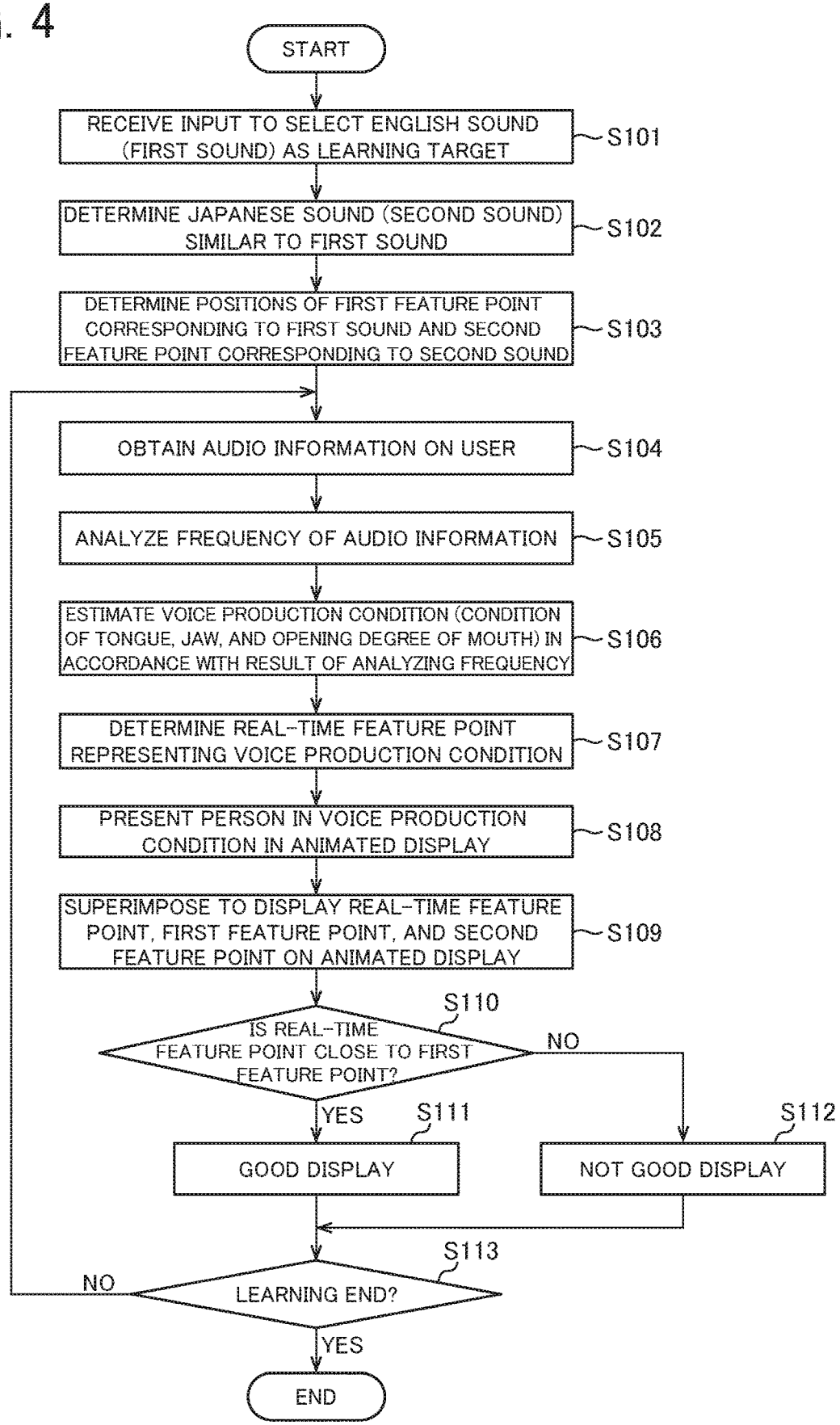
FIG. 4 is a flowchart showing processing of this embodiment.

FIG. 4 is a flowchart showing processing on the information processing apparatus of this embodiment. FIG. 4 shows processing to be executed when a user of, for example, the terminal apparatus 200 learns the first language. First, at Step S101, the operation unit 250 of the terminal apparatus 200 receives an operation to input a learning item by the user. For example, the information processing system 10 of this embodiment may execute processing to support learning pronunciation of a predetermined sound in the first language. In this case, at Step S101, the operation unit 250 may receive selection of a specific sound as a learning target.

For example, as described above, each of the pronunciations ae, α, and Λ in English is close to a pronunciation of a Japanese character "ア" for Japanese people, and these pronunciations might not be easy for the Japanese people to learn. Hence, the information processing system 10 may receive a selection input of the pronunciations ae, α, and Λ in English, and execute processing to support learning these pronunciations. The terminal apparatus 200 transmits, to the server system 100, information identifying an English sound (the first sound of the first language) determined by the operation on the operation unit 250. Note that the operation unit 250 may receive an operation not to select a specific sound such as ae, α, or Λ but to select a word (e.g., hat) containing the specific sound.

At Step S102, the processing unit 110 executes processing to identify a Japanese sound (the second sound of the second language) similar to the English sounds. For example, the storage unit 120 of the server system 100 may store table data in which sounds in English and sounds in Japanese similar to the sounds in English are associated with one another. The processing unit 110 identifies a similar Japanese sound in accordance with the input result of the English sounds and the table data. Note that, the processing at Steps S101 and S102 may involve identifying correspondence between the English sounds and the Japanese sound. The specific order of the steps is not limited to the aforementioned order. For example, at Step S101, a sound of Japanese (e.g., "ア") may be selected, and, at Step S102, sounds of English (e.g., ae, α, and Λ) corresponding to the sound of Japanese may be identified as learning-target sounds. Specific processing can be modified in various manners.

Figure 5:
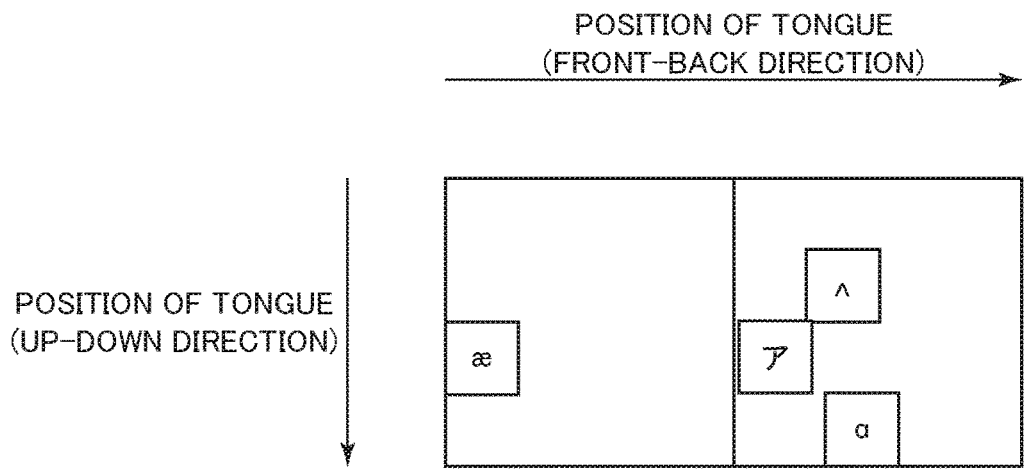
FIG. 5 is a diagram illustrating processing of plotting a given sound on a coordinate space in accordance with a voice production condition.

At Step S103, the processing unit 110 executes processing to identify the positions of the first sounds (ae, α, and Λ) and the position of the second sound ("ア") in a given coordinate space. FIG. 5 is a diagram illustrating an example of a coordinate space (a coordinate plane) and an example of a position corresponding to each of the sounds.

As illustrated in FIG. 5, in this coordinate space, the first axis may be an axis representing a position of the tongue in the up-down direction (a vertical direction), and the second axis may be an axis representing a position of the tongue in the front-back direction. Here, the term "front" means a front direction of a person (a direction in which the face is looking), and the term "back" means a direction opposite to the front direction. Furthermore, the term "up" means a direction from a reference point of the head (e.g., the center) toward the top of the head, and the term "down" means a direction opposite (e.g., a direction from the reference point toward the neck) to the "up" direction. Here, the position of the tongue may represent a position of a specific representative point in the tongue. Alternatively, a position of a portion included in the tongue and moving most in pronouncing a target sound may be selected for each of the sounds. In the example of FIG. 5, the feature point for each sound is determined in accordance with a position of the tongue on a plane (i.e., a cross-section observed when the face of a person is viewed from the side) defined by the front-back and up-down directions of the person. Furthermore, in the example of FIG. 5, the vertical axis (the first axis) may represent an opening degree of the jaw. The example may represent that the jaw opens narrower as the vertical axis goes upwards, and the jaw opens wider as the vertical axis goes downwards.

For example, the storage unit 120 of the server system 100 may store table data in which sounds in each language are associated with values of the sounds on each axis. In the example illustrated in FIG. 5, the storage unit 120 of the server system 100 may store table data in which sounds in each language are associated with positions of the tongue in ideal voice production conditions of the sounds. Here, an ideal voice production condition may be determined, for example, from a result of voice production by the user whose native language is the target language. The processing unit 110 determines first feature points representing positions corresponding to the first sounds, in accordance with the first sounds identified at Steps S101 and S102 and the table data. Likewise, the processing unit 110 determines a second feature point representing a position corresponding to the second sound, in accordance with the second sound and the table data. Note that the first feature points and the second feature point are not limited to single points in the coordinate space, and may be regions having a certain size.

Note that an example of the coordinate space shall not be limited to the above example. For example, the axes of the coordinate space may correspond to information on an oral condition other than the tongue. The oral condition other than the tongue may include information indicating conditions of, for example, the upper jaw, the lower jaw, the palate, and the lips. That is, the first feature points and the second feature point may be points or regions corresponding to positions of, for example, the jaw, the palate, and the lips in producing a voice.

The above processing makes it possible to plot, on the coordinate space, an English sound (a first sound) as a learning target and a Japanese sound (a second sound) similar to the English sound. Furthermore, the information processing system 10 supports learning by prompting the user to actually produce a voice and clearly indicating the result of the voice production and a relationship between the first sound and the second sound.

Figure 6:
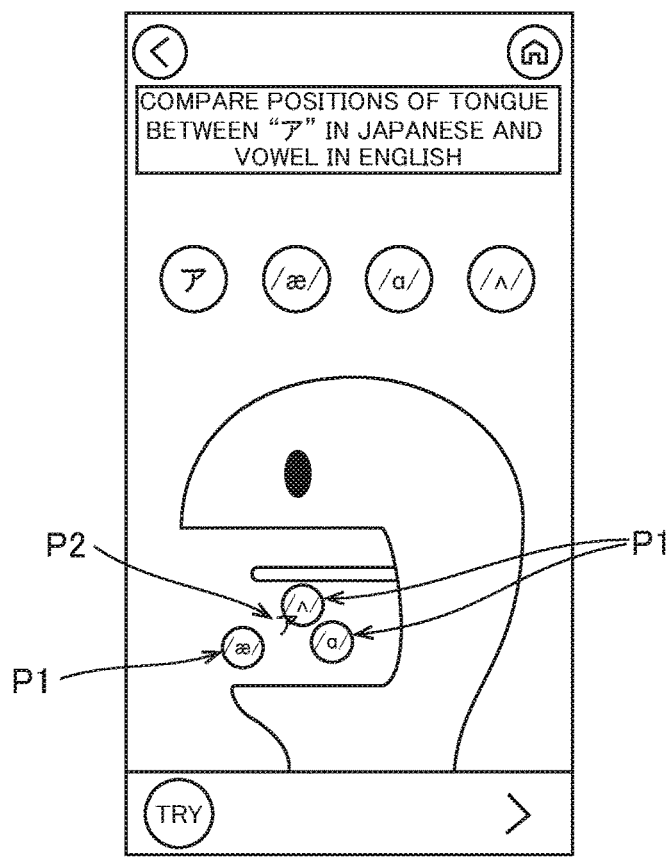
FIG. 6 is an example of a display screen on which feature points representing first sounds and a second sound are superimposed and displayed on animated display.

FIG. 6 is an example of a screen to be displayed by the processing of this embodiment. For example, in accordance with processing on the display processing unit 113, the screen is displayed on the display unit 240 of the terminal apparatus 200. For example, an English learning application may be installed in the storage unit 220 of the terminal apparatus 200, and the processing unit 210 may operate in accordance with the English learning application such that the screen illustrated in FIG. 6 may be displayed. Here, the English learning application may be an application that operates through communications with the server system 100. For example, the user of the terminal apparatus 200 carries out a predetermined operation through a home screen of the English learning application, and selects a first sound (Step S101). The display processing unit 113 may send an instruction to the English learning application in accordance with the selection input and the information obtained in the processing of Steps S102 and S103. In accordance with the instruction, the English learning application may display the screen illustrated in FIG. 6. Although omitted below, an operation of the terminal apparatus 200 to be described below may be executed on the English learning application.

The screen illustrated in FIG. 6 displays, for example, first sounds (ae, α, and Λ) and a second sound ("ア"). Furthermore, the screen displays an image of a person representing a voice production condition of the user. FIG. 6 illustrates an example in which a simplified profile of a person is displayed to show lingual and jaw movements. Alternatively, the example may present another image that can show a voice production condition of the user. The image of the person may be an image that changes in conformity to a real-time voice production condition of the user, as will be described later with reference to Step 104 and the subsequent steps.

Furthermore, as illustrated in FIG. 6, in this embodiment, the first feature points P1 representing the first sounds and the second feature point P2 representing the second sound may be superimposed to be displayed on the image of the person representing the voice production condition. In FIG. 6, the first feature points P1 are illustrated as circular regions representing respective ae, α and Λ. Moreover, in FIG. 6, the second feature point P2 represents the Japanese character "ア" alone. Note that the second feature point P2 may also be illustrated as a circular region. For example, as illustrated in FIG. 5, if the feature points are arranged using a coordinate system representing positions of the tongue, the first feature points and the second feature point are displayed in association with a movable range of the tongue in the profile of the person in FIG. 6. Hence, the user can easily understand a difference in conditions of the tongue when the user produces each sound.

For example, as illustrated in FIG. 6, the display unit 240 may present a text message to read, "Compare the positions of the tongue between "ア" in Japanese and a vowel in English". This presentation can display a difference in voice production conditions between the first sounds and the second sound (a difference in positions of the tongue in the example of FIG. 6) in an easily comprehensible manner.

In FIG. 6, when a "TRY" button at the lower left of the screen is selected for operation, the information processing system 10 starts to obtain audio information based on a voice produced by the user, and to execute processing as to the audio information.

Specifically, at Step 104, the information processing system 10 obtains the audio information generated when the user produces a voice. For example, at Step 104, the display unit 240 of the terminal apparatus 200 executes display processing to prompt the user to pronounce a predetermined word including a first sound. Then, the microphone included in the terminal apparatus 200 records the voice produced by the user to obtain the audio information. The audio information obtaining unit 111 receives the audio information through a network.

At Step S105, the analysis processing unit 112 executes analysis processing of the audio information. For example, the analysis processing unit 112 may analyze a frequency of the audio information to obtain a formant of the audio information. A formant represents a frequency band higher than surrounding frequency bands in a frequency spectrum of audio. Then, at Step 106, the analysis processing unit 112 estimates a real-time voice production condition of the user in accordance with the result of detecting the formant. Here, the "voice production condition" includes information indicating positions of the tongue and the jaw (the upper jaw and the lower jaw). Furthermore, the voice production condition may also include information indicating the positions of the palate and the lips.

For example, in this embodiment, learning processing may be executed in accordance with training data in which the voice production condition is associated as correct answer data with a feature amount including information on the formant. When the feature amount including the formant is received as an input, the learning processing generates a learned model that outputs a voice production condition corresponding to the feature amount. The analysis processing unit 112 may read out the learned model from the storage unit 120 and input to the learned model the feature amount obtained at Step S105, in order to obtain the voice production condition (Step S106). Note that the data input to the model shall not be limited to the feature amount to be obtained from the audio information. The audio information itself may be used as the date to be input.

Alternatively, the analysis processing unit 112 may obtain a similarity between a formant of a voice produced by the user and a formant of a first sound or a second sound, and identify the voice production condition in accordance with the similarity. For example, an ideal voice production condition in the first sound is interpreted to be already known. Hence, the analysis processing unit 112 may obtain the real-time voice production condition so that the closer the voice produced by the user is to the first sound, the closer the voice production condition is to a voice production condition of the first sound.

Furthermore, Patent Document 1 is known as a technique for estimating conditions of the tongue and jaw in accordance with audio information. As the processing at Steps S105 and S106 of this embodiment, a technique similar to that of Patent Document 1 may be used. The technique of Patent Document 1 is well known, and detailed description of the technique will be omitted.

At Step S107, in accordance with the voice production condition obtained at Step S106, the analysis processing unit 112 identifies a point representing the voice production condition and found in the coordinate space. As described above with reference to FIG. 5, in accordance with the voice production condition, the analysis processing unit 112 can identify values (coordinate values) on each axis of the coordinate space.

Figure 7:
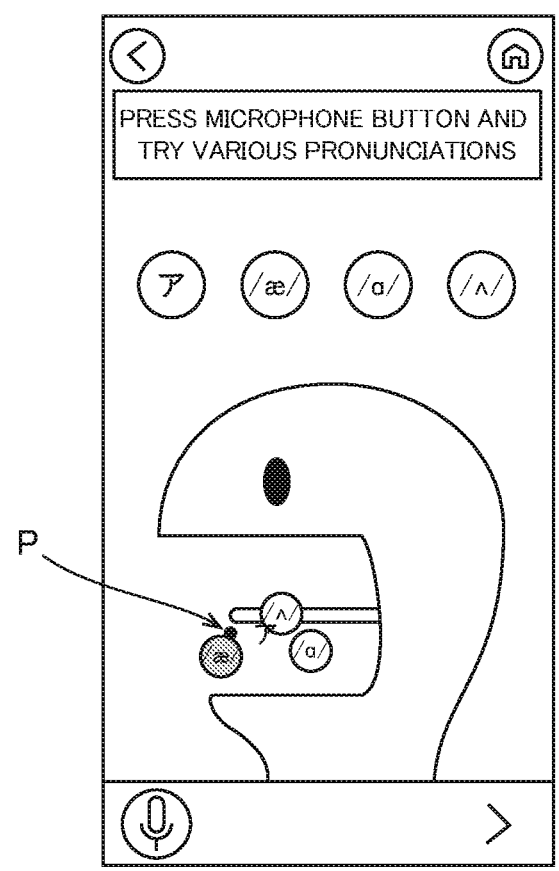
FIG. 7 is an example of a display screen on which the feature points representing the first sounds and the second sound are superimposed and displayed on the animated display.

At Step S108, the display processing unit 113 presents, in animated display, a person in a voice production condition. FIG. 7 illustrates an example of the screen to be displayed (updated) at Step S108. As described above, the animated display is presented on a screen to display the head of the person including the jaw and the tongue. For example, in accordance with a voice production condition estimated from one audio information item, the analysis processing unit 112 generates one voice production condition image (an image of the profile of a person). The display processing unit 113 displays in time series a plurality of voice production condition images generated from a plurality of audio information items, in order to present the voice production condition images in animated display.

For example, as a result of identifying a position of the tongue as a voice production condition in accordance with audio information, assumed is a case where the position of the tongue moves downwards compared with a normal condition (e.g., a condition in FIG. 6). In this case, as illustrated in FIG. 7, the display processing unit 113 displays a voice production condition image showing the tongue positioned downwards compared with the tongue in FIG. 6, in order to present the voice production condition image in animated display. Note that, for the sake of description, FIG. 7 illustrates, as an example, an image in which the opening condition of the jaw does not change from that illustrated in FIG. 6. However, both the tongue and the jaw can change in position.

At Step S109, the display processing unit 113 executes processing to superimpose to display a real-time feature point P on the animated display. The real-time feature point P is identified in accordance with the voice production condition estimated by the analysis processing unit 112. That is, the point P in FIG. 7 changes in position on the image on a real-time basis in accordance with the change in the voice production condition of the user. The point P can show the user whether the voice production condition of the user is close to either the first sound or the second sound (or far from both of the first sound and the second sound) in an easily comprehensive manner. In particular, when an axis representing a position of the tongue is set as the coordinate space, if a currently produced voice is compared with a voice produced as an ideal first sound, the point P allow the user to understand to what extent and in which direction the position of the tongue is out of place. The technique of the present embodiment presents in an easily comprehensive manner what should be improved for ideal pronunciation, making it possible to appropriately support the user for his or her learning. Furthermore, the technique also shows, as an example, a relationship with the second sound. For example, using the second sound familiar to the user as a starting point, the technique can support the user from a viewpoint of how the user should change the position of the tongue to sound his or her pronunciation as the first sound.

Moreover, the display processing unit 113 may execute processing to change a display mode between: a case where a similarity between the voice production condition estimated by the analysis processing unit and a voice production condition corresponding to a first feature point P1 is greater than, or equal to, a predetermined threshold value; and a case where the similarity is smaller than the predetermined threshold value. For example, at Step 110, the analysis processing unit 112 may calculate the similarity in accordance with a distance between the real-time feature point P and the first feature point P1. If the distance is smaller than, or equal to, the threshold value (for example, if the first feature point P1 is a circular region and the real-time feature point P is included in the region), the analysis processing unit 112 determines that the similarity is greater than, or equal to, the threshold value. Alternatively, the analysis processing unit 112 may calculate the similarity between the voice produced by the user and the first sound in accordance with information before the plotting on the coordinate space; that is, for example, the feature amount such as the audio information itself or the formant.

The display processing unit 113 performs: display processing in a first mode (Good display) at Step S111 if the similarity is greater than, or equal to, the threshold value; and display processing in a second mode (Not Good display) at Step S112 if the similarity is smaller than the threshold value. The second mode is different from the first mode.

In the example illustrated in FIG. 7, the feature point P representing the voice production condition of the user is determined to be close to the first feature point P1 corresponding to "ae" and to have a similarity greater than, or equal to, a threshold. Hence, the display processing unit 113 executes processing to display the display mode of the first feature point P1 representing "ae" in a mode different from a condition (e.g., the condition of FIG. 6) in which the similarity is smaller than, or equal to, the threshold value. Such processing makes it possible to present, in an easily comprehensive manner, whether the voice production condition of the user is appropriate. Note that FIG. 7 illustrates an example in which a color of the feature point representing "ae" changes. However, the display mode shall not be limited to such an example. Various kinds of modes can be used to identify whether the voice production condition of the user is close to the first sound. For example, the display processing unit 113 may change a display size of the first feature point P1 or may blink the first feature point P1. Alternatively, in a display region different from the first feature point P1, the display processing unit 113 may display, for example, a text message, an image, and an object representing feedback to a voice produced by the user. The text message representing the feedback may be, for example, "Good" and "Not Good", or may be information presenting a specific part to be corrected if the feedback is Not Good. Likewise, in displaying an image and an object, various modifications can be made.

Alternatively, the display processing unit 113 may execute processing to change a facial expression of the person in animated display, between: a case where the similarity is greater than, or equal to, the predetermined threshold value; and a case where the similarity is smaller than the predetermined threshold value. For example, as will be described later with reference to FIGS. 8A and 8B, the person may be displayed in: a positive facial expression (for example, a smile) for the Good display with which the similarity is greater than, or equal to, the threshold value; and a neutral facial expression or a negative facial expression (for example, a crying face) for the Not Good display with which the similarity is smaller than the threshold value. Such processing makes it possible to present, in an easily comprehensible manner, how well or poorly the user has produced a voice, using the displayed profile of a person.

After the processing at Step S111 or Step S112, at Step S113, the processing unit 110 determines whether to finish the processing for the learning of the sound selected by the user at Step S101. For example, the processing unit 110 may determine whether an end button not shown in either FIG. 6 or FIG. 7 has been operated. If the processing for the learning does not end (Step S113: No), the processing unit 110 returns to Step S104 to continue the processing. That is, the audio information obtaining unit 111 newly obtains audio information on the user, the analysis processing unit 112 performs analysis processing of the audio information, and the display processing unit 113 updates an image in real time in accordance with a result of the analysis.

Furthermore, the first sound in this embodiment may be one sound. For example, the display processing unit 113 may display only one of ae, α, or Λ as an English sound close to "ア" in Japanese. Even in such a case, this embodiment allows the user to learn a learning-target language while comparing a sound of the user's native language with a sound of the learning-target language. Such a feature makes it possible to appropriately support the user. Note that the processing of this embodiment shall not be limited to such processing. For example, if the first language has a first sound and a third sound as sounds similar to a second sound of the second language, the display processing unit 113 may execute processing to superimpose to display, distinguishably from one another, a third feature point, a first feature point, and a second feature point on animated display. The third feature point is identified in accordance with a voice production condition observed when the third sound is pronounced. The first sound is, for example, any one of ae, α, or Λ, and the third sound is, for example, any other one of ae, α, or Λ. Such a feature, as described above with reference to FIGS. 6 and 7, makes it possible to collectively display a plurality of sounds in the first language together on one screen. If the third sound is found in addition to the first sound, the user recognizes that the first language has a plurality of sounds similar to the second sound often used by the user himself or herself. As a result, when learning the first language, the user might not be able to make distinction between the first sound and the third sound. Such a problem could be an obstacle to the learning. In this regard, the technique of this embodiment can present the difference between the first sound and the third sound on one screen in an easily comprehensible manner. Such a feature makes it possible to improve learning efficiency.

2.2 Learning with Flash Cards

As described above, when the second language has a first sound and a third sound (for example, when English has ae, α, and Λ as sounds similar to "ア" in Japanese), it is important for a user, who is a speaker of the second language, to distinguish between the first sound and the third sound in learning the first language.

For example, the display processing unit 113 may execute processing to display an instruction screen to prompt the user to produce a voice in the first sound a predetermined number of times or more, and then, may execute processing to display an instruction screen to prompt the user to produce a voice in the third sound a predetermined number of times or more. Such processing prompts the user to repeatedly produce voices in similar sounds, making it possible to encourage the user to learn the first language in consideration of differences in sounds.

Figure 8A:
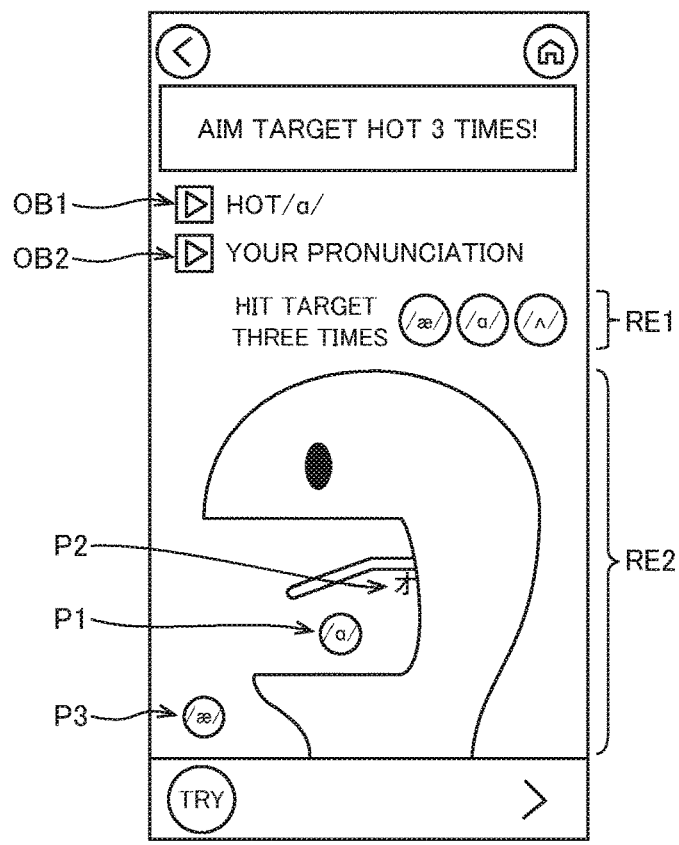
FIG. 8A is an example of a display screen for learning a given sound (word).
Figure 8B:
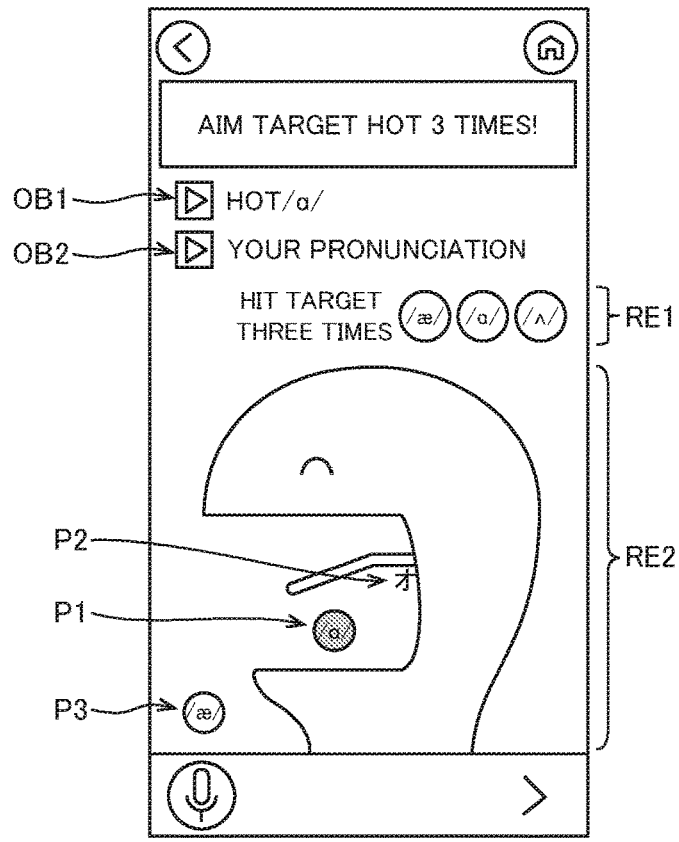
FIG. 8B is an example of a display screen for learning a given sound (word).

FIGS. 8A and 8B illustrate examples of screens to be displayed by the display processing unit 113. For example, the screens are displayed on the display unit 240 of the terminal apparatus 200. For example, in the first stage of learning, the display processing unit 113 may superimpose to display feature points each corresponding to one of the first sound, the third sound, and the second sound on the profile of a person in animated display, and may simultaneously display an image to prompt the user to repeatedly say a word including one of the first sound or the third sound. Note that, in the examples of FIGS. 8A and 8B, the first sound is α in English, the third sound is ae in English, and the second sound is "オ" in Japanese. FIGS. 8A and 8B illustrate the first feature point P1, the third feature point P3, and the second feature point P2 respectively corresponding to the first sound, the third sound, and the second sound. The sound α in English is also similar to "オ" in Japanese, and displaying in such a manner is also useful for supporting Japanese people in learning English. However, a combination of the first sound to the third sound shall not be limited to the above combination. As described above with reference to FIG. 7, a combination of other sounds, such as "ア", "ae", "α", and "Λ", may be used.

Furthermore, the screens illustrated in FIGS. 8A and 8B display a text message to instruct the user to repeat a word "hot" three times. The word "hot" includes the sound of "α". Through learning, using the screens illustrated in FIGS. 8A and 8B, the user can learn how to pronounce the sound of "α", which is likely to be confusing with other sounds.

The screens of FIGS. 8A and 8B change a display mode in the case where a similarity between a voice production condition of the user and any of the sounds (the first sound to the third sound) is greater than, or equal to, a threshold value, compared with the case where the similarity is smaller than the threshold value. For example, FIGS. 8A and 8B may include a region RE1 that displays side by side phonetic symbols of a plurality of sounds that are likely to be confusing. If the analysis processing unit 112 determines that the pronunciation of the user is close to any of the sounds, the display processing unit 113 changes the display mode of an object indicating the sound.

Furthermore, similar to the examples of FIGS. 6 and 7, in a region RE2 presenting animation display corresponding to the profile of the user, the display processing unit 113 updates the image of the person in accordance with conditions of the tongue and the jaw. If a real-time feature point is close to the first feature point P1 and the third feature point P3, the display processing unit 113 changes the display mode of the corresponding feature point.

Furthermore, as illustrated in FIG. 8B, if the analysis processing unit 112 determines that the voice production condition of the user is close to a learning-target sound; that is, the sound of "α" (hereinafter also referred to as "Good determination"), the display processing unit 113 may change the facial expression of the person to a positive facial expression. Such a processing makes it possible to show the user in an easily comprehensive manner whether the user is appropriately pronouncing the learning-target sound.

Note that in determining true or false as to whether the voice production condition of the user is close to a learning-target voice production condition, the true-false determination is executed as processing different from, for example, the processing utilizing frequency analysis (e.g., the determination utilizing a positional relationship between the first feature point and the real-time feature point). Note that the true-false determination here involves outputting two outputs; namely, Good and Not Good. Note that the true-false determination shall not be limited to the Good/Not Good determination. The determination may also be processing to output numeric data in a score (e.g. in the scale of 0 to 100). The score may be higher as the voice production condition of the user is closer to the target. For example, the analysis processing unit 112 may execute processing to compare audio information on the user with audio information representing an ideal pronunciation of "hot", and to calculate the similarity as the score. There are widely known techniques to output a similarity between the two audio information items as a score, and these conventional techniques may be applied to this embodiment. For example, a cloud server different from the server system 100 may execute processing to compare audio information items. In this case, the analysis processing unit 112 requests the cloud server to execute processing to compare the audio information item on the user with the audio information item representing the ideal pronunciation of "hot", and obtains a result of the processing. Note that the true-false determination of this embodiment may be made, using the result of the frequency analysis. For example, the analysis processing unit 112 may obtain the Good/Not Good determination and the score, in accordance with a distance between the first feature point corresponding to the target sound and the real-time feature point representing the voice production condition of the user.

If the analysis processing unit 112 makes the Good determination given times (e.g., three times) in a row on the screens illustrated in FIGS. 8A and 8B, the processing unit 110 may execute processing to move to learning of a different word. For example, when the user can appropriately pronounce "hot" three times in a row, the display processing unit 113 moves to the learning of a word "hut". Because the word "hut" includes the sound "Λ", the user uses a screen that prompts the user to repeatedly pronounce "hut". Hence, the user can learn the pronunciation of "Λ" that is likely to be confusing with other sounds. Likewise, if the user successfully pronounces "hut" given times in a row, the processing unit 110 moves to learning of a word "hat". Because the word "hat" includes the sound of "ae", the user uses a screen that prompts the user to repeatedly pronounce "hat". Hence, the user can learn the pronunciation of "ae" that is likely to be confusing with other sounds. Note that the order of learning is not limited to the above example, and "hat", "hut" and "hot" may be learned in a different order.

When the learning in the first stage, which is for learning word-by-word, is completed, the processing unit 110 may execute processing, as learning in a second stage, to allow the user to quickly pronounce a plurality of words including similar sounds. For example, the display processing unit 113 may execute processing to display an instruction screen to prompt the user to continuously say a plurality of words including a word including the first sound and a word including the third sound. Such processing can prompt the user to continuously say a group of words including sounds to be distinctively pronounced, such that the user can pronounce a sound suitable to each of the first sound and the third sound.

For example, the processing unit 110 selects words predetermined times (e.g., 10 times) from among the three words "hat", "hut", and "hot", and arranges the selected words, while allowing that the same word is selected twice or more. Hence, the processing unit 110 creates a word list. The display processing unit 113 sequentially displays the words included in the word list, and displays a message prompting the user to pronounce the displayed words. Such processing can prompt the user to quickly say a plurality of words including sounds that are likely to be confusing, so that the user can learn appropriate pronunciation of the confusing sounds.

Figure 9:
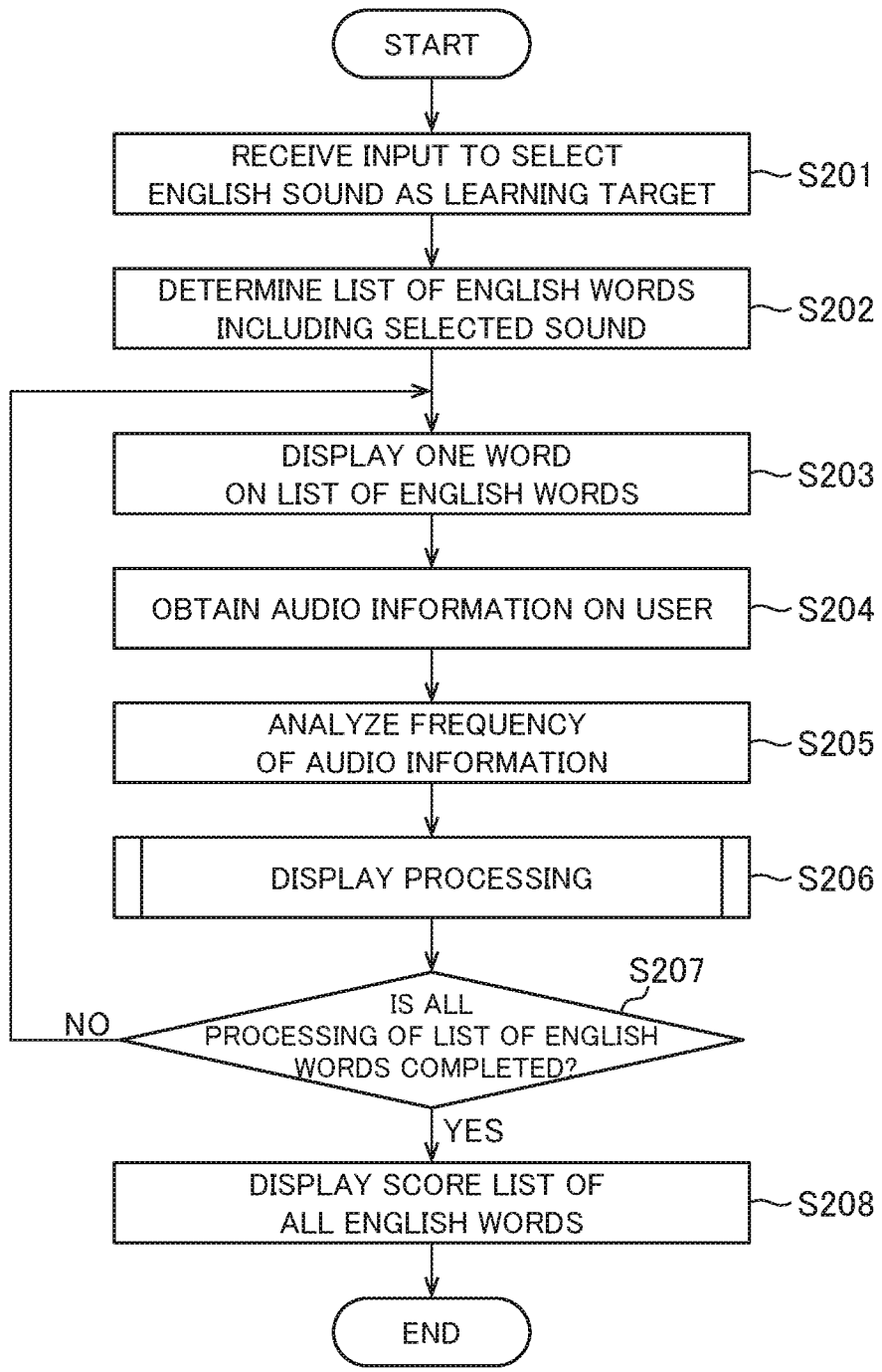
FIG. 9 is a flowchart showing processing of this embodiment.

FIG. 9 is a flowchart showing processing in such a case. First, at Step S201, the operation unit 250 of the terminal apparatus 200 receives a selection input of an English sound as a learning target. For example, the operation unit 250 may receive a selection input of three sounds "ae", "α", and "Λ". For example, the display unit 240 may execute processing to display a list of sounds that are likely to be confused by speakers of the second language, and the operation unit 250 may receive an operation to select of any of the sounds on the list.

At Step S202, the processing unit 110 creates a list of words to be said, in accordance with the selection input by the user. As described above, the word list here is a list containing groups of words including any of a plurality of sounds that are likely to be confusing. The groups of words are arranged in a given order. Here, the order may be fixed or may be randomly determined for each learning stage (each time the processing in FIG. 9 is executed).

Figure 10A:
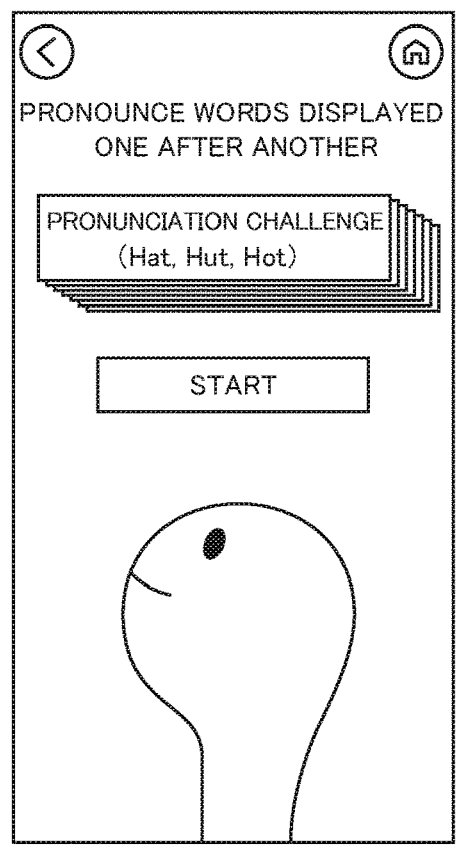
FIG. 10A is an example of a display screen for learning with a word list.

At Step S203, the display processing unit 113 displays a first word of the word list on the display unit 240 of the terminal apparatus 200. FIG. 10A is an example of a screen displayed at a start stage of learning (for example, after Step S202 and before Step S203). The screen illustrated in FIG. 10A includes, for example, a text message presenting a specific learning menu "PRONOUNCE WORDS DISPLAYED ONE AFTER ANOTHER", a group of words (Hat, Hut, Hot) to be pronounced, and a start button. For example, when the user selects to operate the start button, the processing at Step S203 is executed.

Figure 10B:
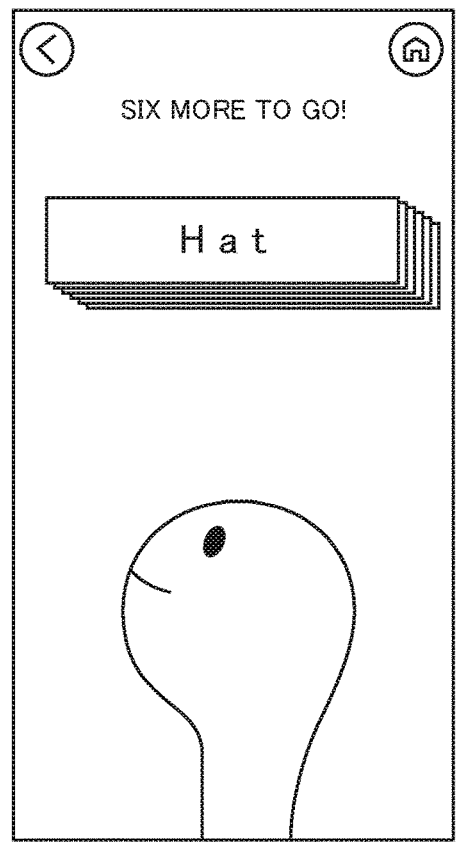
FIG. 10B is an example of a display screen for learning with a word list.

FIG. 10B is an example of a screen to be displayed at Step S203. For example, FIG. 10B shows a state in which a word list includes six words not learned yet (not pronounced yet). In such a state, a word "Hat" is displayed. A microphone of the terminal apparatus 200 is in operation. When the user views the screen in FIG. 10B and pronounces "hat", the microphone records at Step S204 audio information on the user. The audio information obtaining unit 111 of the server system 100 obtains the audio information through a network.

At Step S205, the analysis processing unit 112 executes analysis processing of the audio information. For example, as seen at Step S105, the analysis processing unit 112 obtains a feature amount such as a formant and inputs the feature amount to a learned model, in order to identify a voice production condition of the user. Furthermore, the analysis processing unit 112 determines a similarity between the voice production condition of the user and a voice production condition of a learning-target sound. As described above, the similarity determination (the true-false determination) may be executed as processing different from the processing to identify a voice production condition. In the example of FIG. 10B, the analysis processing unit 112 makes: the Good determination if a similarity between the voice production condition of the user and a voice production condition of "Hat" (in a narrower sense, a voice production condition of "ae") is greater than, or equal to, a threshold value; and the Not Good determination if not.

At Step S206, the display processing unit 113 executes processing to display a result of the analysis executed on the analysis processing unit 112. Here, for example, as seen in FIGS. 6 to 8B, the display processing unit 113 may, for example, present the profile of a person in animated display, display a real-time feature point, and change a display mode of each feature point in accordance with a similarity. However, as will be described later with reference to FIG. 10D, the result of the analysis processing may be collectively displayed after the user finishes pronouncing all the words on the word list. The processing at Step S206 may be omitted. Furthermore, in the example of FIG. 10B, animation display corresponding to the conditions of the tongue and the jaw of a person is not executed. Hence, the analysis processing unit 112 may omit the processing to identify a voice production condition and execute the similarity determination (true-false determination) alone.

At Step S207, the display processing unit 113 determines whether all the processing of the word list is completed. The processing here involves displaying a target word and obtaining, as audio information, a voice produced in response to the display. If there is a word left unprocessed, (Step 207: No), the display processing unit 113 returns to Step 203 to continue the processing.

Figure 10C:
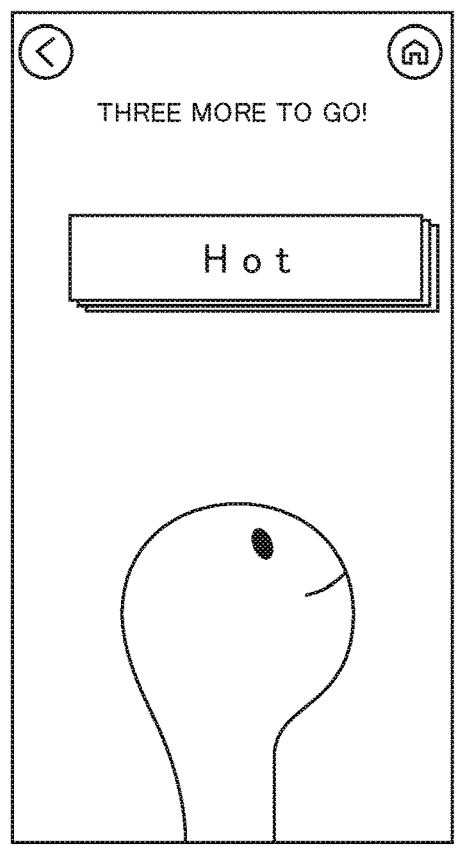
FIG. 10C is an example of a display screen for learning with a word list.

For example, when executing the processing at Step S203 again, the display processing unit 113 executes processing to display the first word in the order among unprocessed words on the word list. FIG. 10C is an example of a screen to be displayed on the display unit 240 after FIG. 10B. For example, FIG. 10C shows a state in which a word list includes three words not learned yet (not pronounced yet). In such a state, a word "Hot" is displayed. The processing in this case is the same as that at Steps S204 to S207 described above. The processing to be executed includes the audio-information obtaining processing, the analysis processing, the display processing (may be omitted), and the completion determining processing.

Figure 10D:
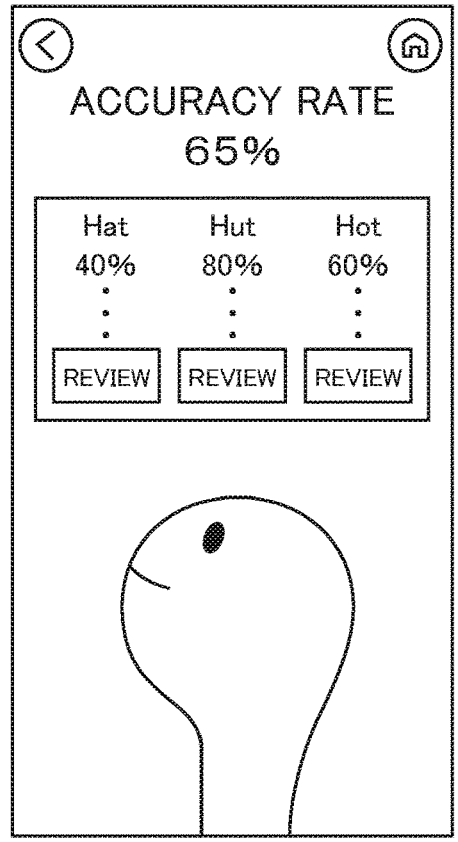
FIG. 10D is an example of a display screen for learning with a word list.

If the processing of all the words included in the word list is completed (Step 207: Yes), the display processing unit 113 executes processing at Step S208 to display a result of learning. FIG. 10D is an example of a screen to be displayed at Step S208.

In the example of FIG. 10D, the display processing unit 113 displays accuracy rates as to the three words "hat", "hut", and "hot". Here, an accuracy rate is information to be determined from the result of the similarity determination (the true-false determination). For example, the accuracy rate indicates a percentage of a count at which the Good determination is made with respect to a count at which each word is displayed. Hence, the display processing unit 113 displays an accuracy rate for each of the words. Such a feature makes it possible to present in an easily comprehensive manner whether the user can distinguish pronunciations of similar sounds and whether the user is not good at pronouncing a particular word. Furthermore, the display processing unit 113 may display an overall accuracy rate of a plurality of words. In this case, in the example of FIG. 10D, the display processing unit 113 can present the user how accurately the user can pronounce an English sound similar to the Japanese "ア".

Note that, as illustrated in FIG. 10D, an object (a button) may be displayed in association with the accuracy rate of each word, so that the user can review the word. For example, if an object corresponding to "hat" is selected, the display processing unit 113 may return to FIG. 8A and FIG. 8B to execute display processing to prompt the user to repeatedly say "hat" a predetermined number of times. As described above, the user learns the first language while switching between learning in the first stage (learning word-by-word) and learning in the second stage (learning in combination of a plurality of words including similar sounds). Such learning can appropriately develop pronunciation skills of the user. Especially in the second stage, the user quickly pronounces displayed words; that is, the user learns words with a so-called flash cards. Such learning allows the user to easily memorize a relationship between a word and its pronunciation.

Furthermore, the technique of this embodiment may involve learning by listening in addition to learning by speaking that allows the user to speak. For example, as illustrated in FIGS. 8A and 8B, the display processing unit 113 may display an object for outputting a result of producing a voice by the user himself or herself. In the example of FIG. 8A, the display processing unit 113 displays reproducing object OB1 and OB2. If the user selects to operate the reproducing object OB1, the processing unit 110 (or the processing unit 210) outputs audio information (e.g., audio information on a speaker of the first language or on an instructor of the first language) presenting a desired sound of "hot". In addition, if the user selects to operate the reproducing object OB2, the processing unit 110 outputs audio information generated when the user say the word "hot". As described above, the audio information on the user is recorded for analysis processing. By outputting the audio information, the processing unit 110 allows the user to check by himself or herself his or her own pronunciation.

In this way, an ideal pronunciation and the pronunciation of the user can be compared with each other with auditory information in addition to visual information using animated display of the profile of a person and feature points. Such a feature can improve learning efficiency of the user.

Furthermore, the display processing unit 113 may: execute processing to display character information as a phonetic symbol of the first sound, if a proficiency level of the user is determined low; and execute processing to display image information representing, as the phonetic symbol of the first sound, a shape of a mouth observed when the user pronounces the first sound, if the proficiency level of the user is determined high.

Figure 11A:
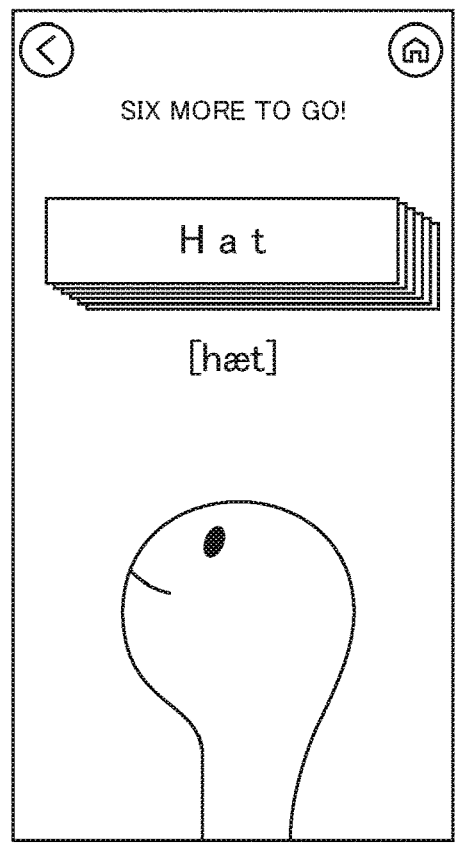
FIG. 11A is an exemplary screen displaying a phonetic symbol of character information.
Figure 11B:
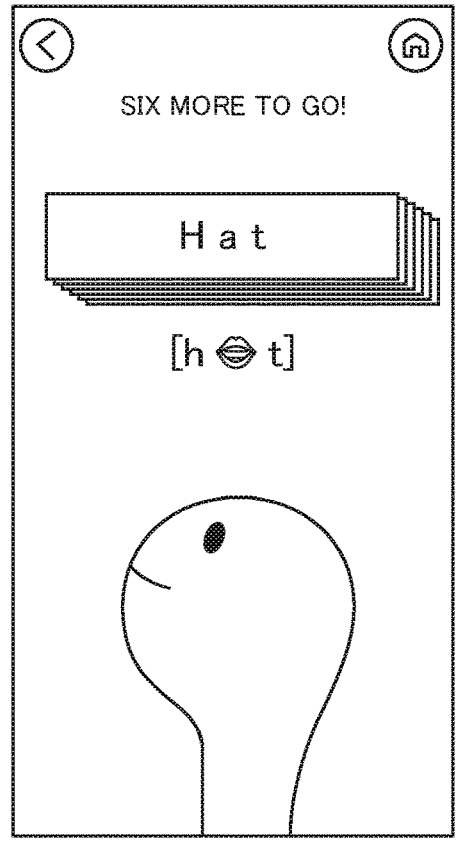
FIG. 11B is an exemplary screen displaying a phonetic symbol of image information.

FIG. 11A is an example of a screen on which the character information is displayed as a phonetic symbol. FIG. 11B is an example of a screen on which image information is displayed as a phonetic symbol. For example, in FIGS. 8A, 8B, and 10A to 10D, if the accuracy rate of the user is lower than a predetermined threshold value, the analysis processing unit 112 determines that his or her proficiency level is low. In this case, the user does not probably have much understanding of a voice production condition (an oral condition) to be observed when the target sound is pronounced. Hence, the display processing unit 113 displays phonetic symbols representing character information (FIG.

11A). The phonetic symbols are widely used and easy to understand even for a user with a low proficiency level.

On the other hand, if the accuracy rate of the user is higher than the predetermined threshold value, the analysis processing unit 112 determines that the proficiency level of the user is high. In this case, the user probably has much understanding of a voice production condition (an oral condition) to be observed when the target sound is pronounced. Hence, the display processing unit 113 displays a phonetic symbol representing the image information and visually displaying the voice production condition (FIG. 11B). Such features can make the user more aware of movement of the tongue and the jaw, and further improve the proficiency level of the user.

2.3 EXAMPLES

A user speaking the second language might not be familiar with the pronunciation of the first language on a daily basis, and could be difficult to learn. Hence, in this embodiment, the first language may be learned with daily pronunciation of the second language utilizing as guidance.

For example, the display processing unit 113 may execute processing to: determine a daily action for producing a voice, utilizing a voice production condition close to a voice produced in the first sound; and display the daily action in association with a word including the first sound. Such processing associates a pronunciation of the first language with a daily action, making it possible to enhance understanding of the user.

Figure 12:
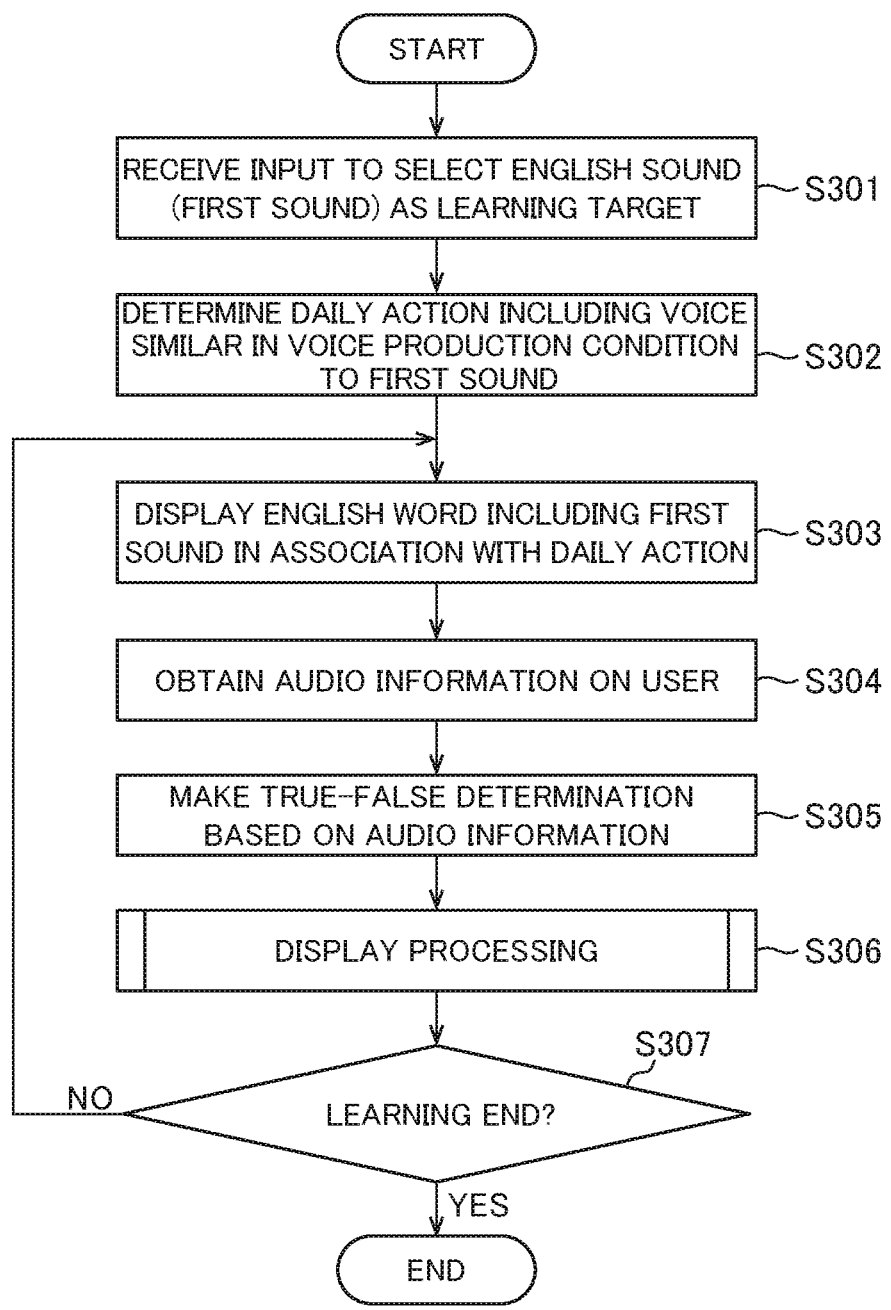
FIG. 12 is a flowchart showing processing of this embodiment.

FIG. 12 is a flowchart showing processing on the information processing system 10 in the above processing. First, at Step S301, the operation unit 250 of the terminal apparatus 200 receives a selection input of an English sound as a learning target. For example, the operation unit 250 may receive a selection input of "h" or an input of a word including "h" (e.g., hat, hut, and hot).

At Step S302, the processing unit 110 determines a daily action similar in voice production condition to the first sound, in accordance with the selection input by the user. For example, the storage unit 120 may store table data in which sounds of the first language are associated with daily actions. The processing unit 110 determines a corresponding daily action in accordance with the sound of the first language (the first sound) selected at Step S301 and the table data. For example, the processing unit 110 determines an action to "fog a window glass with breath before cleaning the window glass" as a daily action corresponding to the sound of "h".

Figure 13:
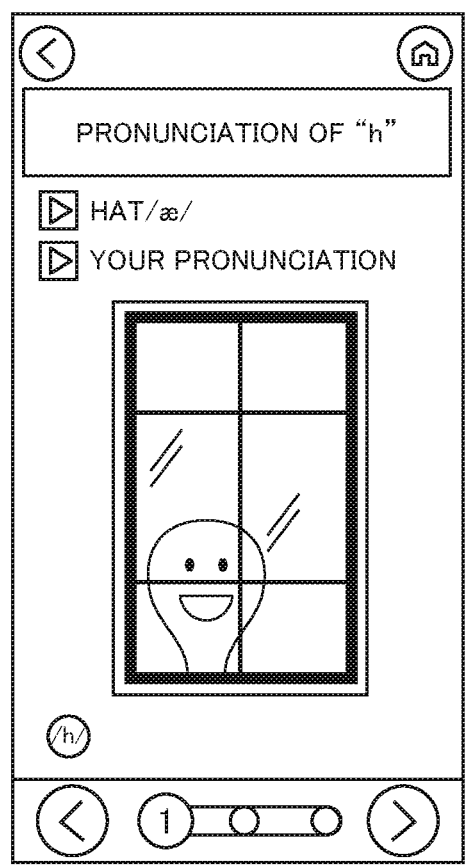
FIG. 13 is an exemplary screen displaying a word and a daily action in association with each other.

At Step S303, the display processing unit 113 executes processing to display a word including the first sound in association with the daily action. FIG. 13 shows an example of a screen displaying a word "hat" including "h" as the first sound in association with the action to fog a window glass with breath before cleaning the window glass as a daily action. The screen illustrated in FIG. 13 displays an image showing a daily action, making it possible to suggest the user for a voice production condition suitable to production of the first sound.

At Step S304, the microphone of the terminal apparatus 200 records audio information on the user. The audio information obtaining unit 111 of the server system 100 obtains the audio information through a network.

At Step S305, the analysis processing unit 112 makes true-false determination based on the audio information. For example, as described above, the analysis processing unit 112 determines Good/Not Good determination or calculates a score by a technique different from frequency analysis.

Furthermore, as described above, these processing steps may be executed on a server different from the server system 100. Moreover, at Step S305, the analysis processing unit 112 may execute processing including frequency analysis, as seen at Step S105. For example, the analysis processing unit 112 obtains a feature amount such as a formant and inputs the feature amount to a learned model, in order to identify a voice production condition of the user. Furthermore, the analysis processing unit 112 determines a similarity between the voice production condition of the user and a voice production condition of a learning-target sound. In the example of FIG. 13, the analysis processing unit 112 makes: the Good determination if a similarity between the voice production condition of the user and a voice production condition of "hot" (in a narrower sense, a voice production condition of "h") is greater than, or equal to, a threshold value; and the Not Good determination if not.

At Step S306, the display processing unit 113 executes processing to display a result of the processing executed on the analysis processing unit 112. For example, the display processing unit 113 displays a determination result related to Good and Not Good as a result of the true-false determination, and a score indicating the similarity. Furthermore, at Step S305, if the analysis processing unit 112 executes frequency processing, the display processing unit 113 may, as seen in FIG. 6 to FIG. 8B, for example, present animated display of the profile of a person, display a real-time feature point, and change a display mode in accordance with the similarity.

At Step S307, the display processing unit 113 determines whether to finish the processing for the learning of the sound selected at Step S301. For example, if the operation unit 250 of the terminal apparatus 200 receives an end operation performed by the user, the display processing unit 113 determines that the processing for the learning ends. If the processing for the learning does not end (Step S307: No), the display processing unit 113 returns to Step S303 to continue the processing. If the processing for the learning ends (Step S307: Yes), the processing shown in FIG. 12 ends.

Furthermore, the guidance display on the display processing unit 113 shall not be limited to one presenting a daily action. For example, the display processing unit 113 may execute processing to determine a similar-sounding word and to display the similar-sounding word in association with the word including the first sound. The similar-sounding word is a word of the second language, and includes a voice production condition close to a voice produced in the first sound.

For example, a sound "sh" is likely to sound close to a pronunciation of a mimetic word to be used as a sound of a running steam locomotive in the Japanese language. Hence, the display processing unit 113 displays such a mimetic word as a similar-sounding word together with an English word including "sh". Such a feature makes it possible to support learning the pronunciation of "sh". For example, the display processing unit 113 may perform processing to display a word including "sh" in association with an image of a steam locomotive and a mimetic Japanese word that suits the image of the steam locomotive. Alternatively, a sound "s" is likely to sound close to the first syllable of a Japanese word "suica (watermelon)". Hence, the display processing unit 113 displays "suica" as a similar-sounding word in association with an English word including "s". Such a feature makes it possible to support learning the pronunciation of "s".

Figure 14:
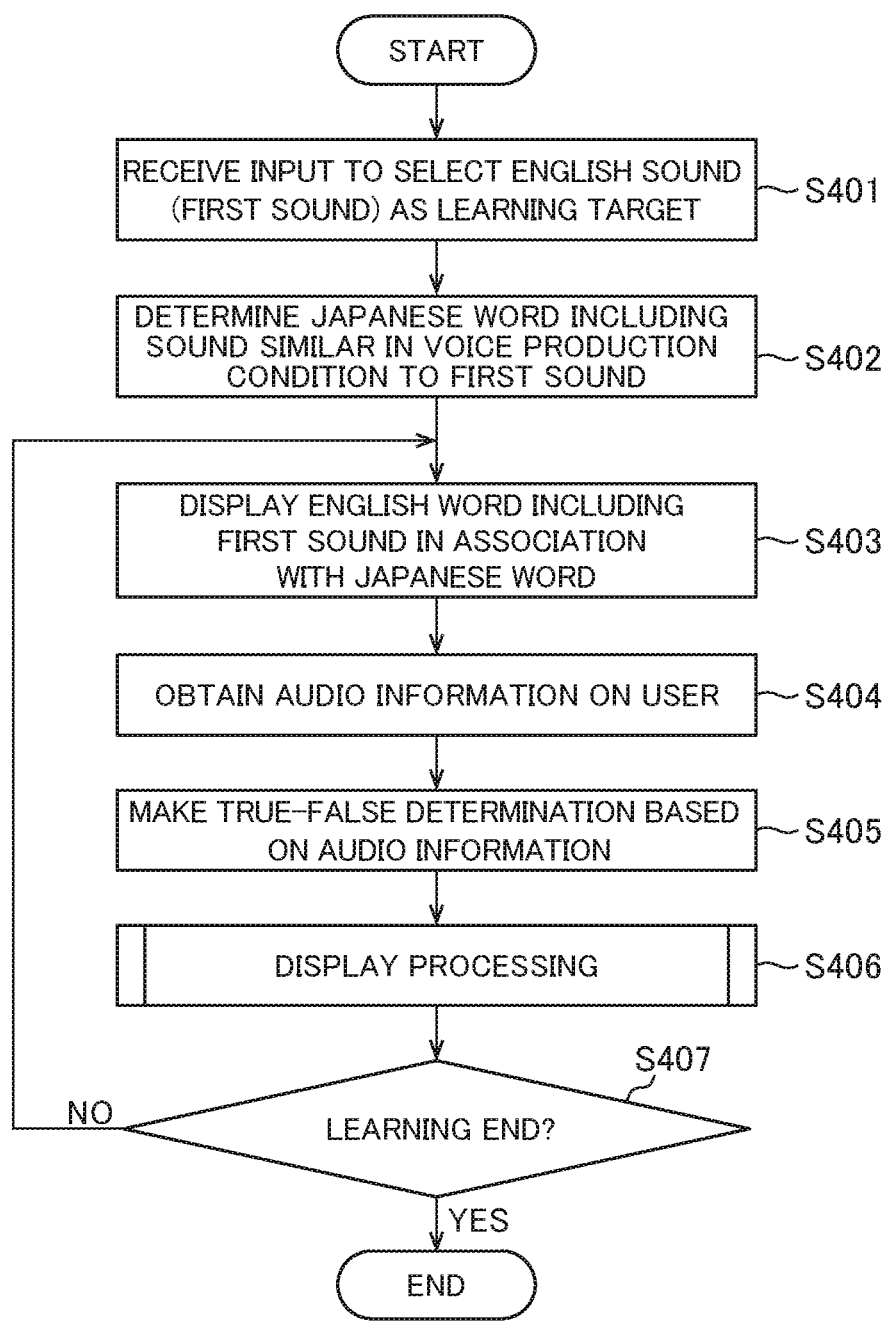
FIG. 14 is a flowchart showing processing of this embodiment.

FIG. 14 is a flowchart showing processing on the information processing system 10 in the above processing. First, at Step S401, the operation unit 250 of the terminal apparatus 200 receives a selection input of an English sound as a learning target. For example, the operation unit 250 may receive a selection input of "sh" and "s".

At Step S402, in accordance with the selection input by the user, the processing unit 110 determines a similar-sounding word in the second language. The similar-sounding word is similar in voice production condition to the input English sound as the learning target. For example, the storage unit 120 may store table data in which sounds of the first language are associated with similar-sounding words. The processing unit 110 determines a corresponding similar-sounding word in accordance with the sound of the first language (the first sound) selected at Step S401 and the table data. Note that the table data may be data in which a daily action or a similar-sounding word is associated with a sound of the first language. In this case, the processing at Step S302 in FIG. 12 and the processing at Step S402 in FIG. 14 can be executed in common.

At Step S403, the display processing unit 113 executes processing to display a word including the first sound in association with the similar-sounding word. At Step S404, the microphone of the terminal apparatus 200 records audio information on the user. The audio information obtaining unit 111 of the server system 100 obtains the audio information through a network.

At Step S405, the analysis processing unit 112 makes true-false determination based on the audio information. At Step S406, the display processing unit 113 executes processing to display a result of the processing executed on the analysis processing unit 112.

At Step S407, the display processing unit 113 determines whether to finish the processing for the learning of the sound selected at Step S401. If the processing for the learning does not end (Step S407: No), the display processing unit 113 returns to Step S403 to continue the processing. If the processing for the learning ends (Step S407: Yes), the processing shown in FIG. 15 ends.

Note that, as can be seen, this embodiment has been described in detail. However, it will be readily understood by those skilled in the art that many modifications are possible unless otherwise substantially departing from the new matters and advantageous effects of this embodiment. Accordingly, all such modifications are intended to fall within the scope of the present disclosure. For example, a term described at least once in the specification or the drawings with a different term that is broader than or synonymous with the term may be replaced with the different term at any point in the specification or the drawings. All the combinations of this embodiment and the modifications are also within the scope of the present disclosure. Furthermore, the configurations and the operations of, for example, the information processing system, the server system, and the terminal apparatus are not limited to those described in this embodiment. The configurations and operations can be modified in various manners.

The invention claimed is:

1. An information processing apparatus, comprising:
a processor that:
obtains audio information on a user learning a first language;
estimates a voice production condition representing conditions of a jaw and a tongue of the user by analyzing the audio information; and
causes a display to display:
a plurality of voice production condition images in animated display, in accordance with a time-series change of the estimated voice production condition, and
a first feature point, a second feature point, and a real-time feature point all superimposed on the plurality of voice production condition images in the animated display, wherein
the processor identifies the first feature point in accordance with the voice production condition observed when a first sound in the first language is pronounced,
the processor identifies the second feature point in accordance with the voice production condition observed when a second sound similar to the first sound is pronounced in a second language different from the first language,
the processor identifies the real-time feature point in accordance with the voice production condition estimated by analyzing the audio information corresponding to a real-time voice production condition of the user, and
the processor performs display processing that recommends to the user a change from a state where the real-time feature point is in a position corresponding to the second feature point to a state where the real-time feature point is in a position corresponding to the first feature point.

2. The information processing apparatus according to claim 1, wherein the processor changes a display mode between:
a case where a similarity between the voice production condition estimated by the processor and the voice production condition corresponding to the first feature point is greater than or equal to a predetermined threshold value, and
a case where the similarity is smaller than the predetermined threshold value.

3. The information processing apparatus according to claim 2, wherein
the animated display is presented on a screen to display a head of a person including a jaw and a tongue, and
the processor changes a facial expression of the person in the animated display between:
a case where the similarity is greater than or equal to the predetermined threshold value, and
a case where the similarity is smaller than the predetermined threshold value.

4. The information processing apparatus according to claim 1, wherein when the first language has the first sound and a third sound as sounds similar to the second sound of the second language, the processor causes the display to display an instruction screen to prompt the user to continuously say a plurality of words including a word including the first sound and a word including the third sound.

5. The information processing apparatus according to claim 1, wherein
when the first language has the first sound and a third sound as sounds similar to the second sound of the second language, the processor causes the display to superimpose, distinguishably from one another, a third feature point, the first feature point, and the second feature point on the animated display, and
the processor identifies the third feature point in accordance with the voice production condition observed when the third sound is pronounced.

6. The information processing apparatus according to claim 5, wherein the processor causes the display to display:

an instruction screen to prompt the user to produce a voice in the first sound a predetermined number of times or more, and then, an instruction screen to prompt the user to produce a voice in the third sound a predetermined number of times or more.

7. The information processing apparatus according to claim 1, wherein the processor causes the display to display:

character information as a phonetic symbol of the first sound, when a proficiency level of the user is determined low, and image information representing, as the phonetic symbol of the first sound, a shape of a mouth observed when the user pronounces the first sound, when the proficiency level of the user is determined high.

8. The information processing apparatus according to claim 1, wherein the processor:

determines a daily action for producing a voice utilizing the voice production condition close to a voice produced in the first sound, and causes the display to display the daily action in association with a word including the first sound.

9. The information processing apparatus according to claim 1, wherein the processor:

determines a similar-sounding word, and causes the display to display the similar-sounding word in association with a word including the first sound, and the similar-sounding word is a word of the second language including the voice production condition close to a voice produced in the first sound.

10. An information processing method, comprising:

obtaining audio information on a user learning a first language;

estimating a voice production condition representing conditions of a jaw and a tongue of the user by analyzing the audio information; and displaying a plurality of voice production condition images in animated display, in accordance with a time-series change of the estimated voice production condition, wherein the displaying includes displaying a first feature point, a second feature point, and a real-time feature point superimposed on the plurality of voice production condition images in the animated display, the first feature point is identified in accordance with the voice production condition observed when a first sound in the first language is pronounced, the second feature point is identified in accordance with the voice production condition observed when a second sound similar to the first sound is pronounced in a second language different from the first language, the real-time feature point is identified in accordance with the voice production condition estimated by analyzing the audio information corresponding to a real-time voice production condition of the user, and the information processing method further comprises:

performing display processing that recommends to the user a change from a state where the real-time feature point is in a position corresponding to the second feature point to a state where the real-time feature point is in a position corresponding to the first feature point.

* * * * *